Dec. 25, 1956    R. G. GIBSON    2,775,176
COMBINATION IMPLEMENT CARRIER AND HITCH FOR TRACTORS
Filed May 18, 1953    2 Sheets-Sheet 1

INVENTOR.
Robert G. Gibson.
BY
ATTORNEYS.

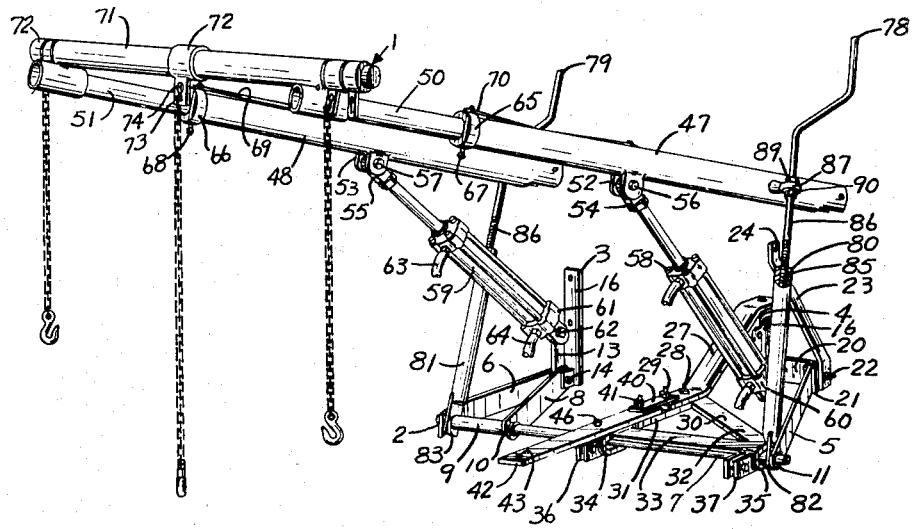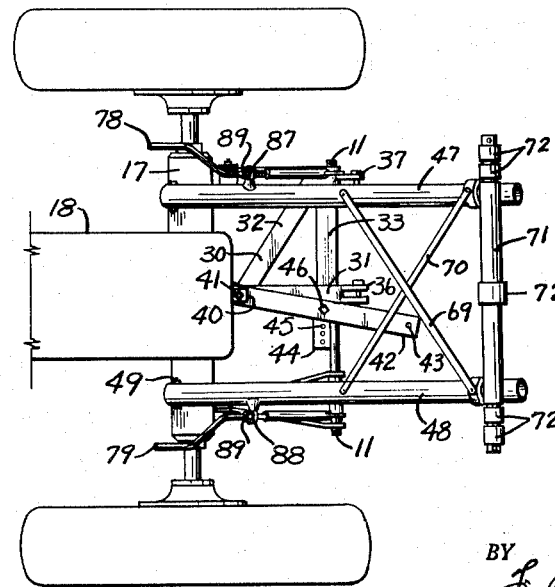

United States Patent Office 2,775,176
Patented Dec. 25, 1956

2,775,176

COMBINATION IMPLEMENT CARRIER AND HITCH FOR TRACTORS

Robert G. Gibson, Falls City, Nebr.

Application May 18, 1953, Serial No. 355,526

6 Claims. (Cl. 97—46.35)

This invention relates to a combination implement carrier and hitch for tractors, and more particularly to a device for pulling of an implement behind a tractor and for raising the same from the ground by hydraulically operated booms for transporting the implement from one place of use to another.

The principal object of the invention is to provide a carriage mounted on the transmission and axle of a tractor and extending rearwardly therefrom, including a hitch having a triangular-shaped member with an attachment for the implement which may be moved laterally of said carriage as desired and fluid means operable from the tractor for adjusting the height of the hitch and for raising the implements off the ground and transporting the same.

Other objects of the invention are to provide a carriage extending rearwardly of the tractor having a cross arm to which a triangular-shaped hitch is engaged and may be moved laterally; to provide a swinging draft or draw bar attached to the transmission housing of the tractor having an extension arm pivoted on the rear end thereof to which an implement may be attached for adjustment of the hitch laterally of the tractor, to provide means for holding the arm in adjusted position, to provide hydraulically operated cylinders having one end attached to the frame attached to the tractor and the other end to rearwardly extending telescoping booms attached to the tractor above said rear axle; to provide screw means having one end attached to said rearwardly extending carriage and the other end attached to said telescoping boom for raising and lowering said hitch to adjust the depth of the implement moved by the tractor and for connecting the carriage to the booms; to provide means attached to the outer end of the telescoping booms for attachment to the implement to raise the same from the ground upon operation of the hydraulic cylinders; to provide means for attaching the implement to the draw bar of the hitch; to provide means for adjusting the length of the telescoping booms; to provide swinging movement of the draw bar so that the line of draft of the implement will follow the tractor, and to provide a device of this character accessible to and readily operable by the driver of the tractor.

In accomplishing these and other objects of the present invention, I have provided improved details of structure, the preferred forms of which are illustrated in the accompanying drawings, wherein:

Fig. 4 is an elevational perspective view of the device disassembled from the tractor.

Fig. 5 is a plan view of the device attached to the tractor.

Figure 1:
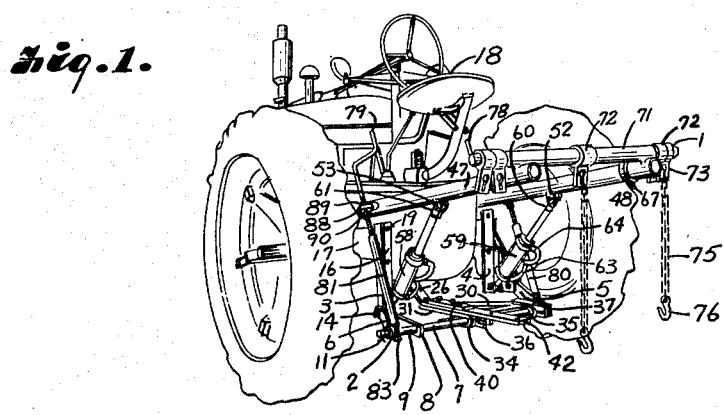
Fig. 1 is a perspective view of my invention shown attached to the rear of a tractor.

Referring more in detail to the drawings:

1 designates a combined implement carrier and hitch for tractors embodying the features of my invention comprising, a carriage 2 pivotally connected to standards or uprights 3 and 4 rigidly secured to the axle housing as later described. The carriage 2 includes side arms 5 and 6, a cross arm or rod 7 connecting the outer ends of said side arms, and a brace arm 8 having one end secured to the standard 3 and the other end to the rod 7 spaced from the outer end of the arm 6 by a sleeve or the like 9 and held in place by collar 10. The side arms 5 and 6 are held on the rod 7 by cotter pins or the like 11 extending through openings 12 in the ends of said rod.

The standards 3 and 4 are of angle shape and the side arm 6 and brace arm 8 are pivotally attached to the angle 13 of the standard 3 by bolts or the like 14. Extending upwardly from the angle 13 of the standards 3 and 4 are arms 16 which are secured to the axle 17 of a tractor 18 by bolts or the like 19. An arm 20 extends outwardly from the standard 4, having a laterally turned end 21 to which is pivotally attached by a bolt 22 one end of the side arm 5. Also secured to the arm 20 by the bolt 22 is a brace arm 23 having its upper end attached to the axle housing by a cap screw (not shown) extending through an opening 24 in the end of said brace arm. It will be noted the side arm 6 and brace arm 8 are also pivotally mounted to the angle 13 of the standard 3 by the bolt 14 so that the carriage 2 pivots with respect to said standards.

Pivotally mounted to the transmission housing 25 of the tractor by a pin or the like 26 is a draft or draw bar 27 extending downwardly at an angle and then outwardly to which is rigidly attached by bolts 28 and 29 a triangular-shaped member 30. The pin 26 provides a loose connection for the draft bar 27 so as to allow for up and down movement of the bar upon raising or lowering of the carriage 2. The outer ends of the arms 31 and 32 of the triangular-shaped member 30 are extended outwardly from the bar 33 of said member and turned downwardly and inwardly as indicated at 34 and 35 to engage over and move laterally along the rod 7. Extending outwardly from the curved ends of the arms 34 are spaced ears 36 and 37 to which an implement 38 may be attached by pins or the like 39 for attachment of the implement to the triangularly-shaped member of the hitch. When so attached the triangular-shaped member 30 may move laterally to the left on the cross arm 7 to provide a floating hitch for the implement.

In order to provide a stationary hitch for the implement a plate 40 is secured to the outer end of the draft bar 27 by the bolt 29. Secured to the other end of said plate by a bolt 41 is pivotally mounted an extension bar 42 to which the implement or the like may be attached by a pin (not shown) through the opening 43 in the end of said bar. Secured to the forward side of the rod 7, by welding or other suitable means, is a plate 44 having a plurality of spaced openings 45 and the extension bar 42 of the draft bar may be adjusted laterally on the plate 44 and held in place by a pin 46 engaging in the openings 45 to regulate the lateral attachment of the implement with respect to the carriage 2 of the hitch. When the stationary hitch is used the implement is not attached to the triangularly-shaped hitch.

Figure 2:
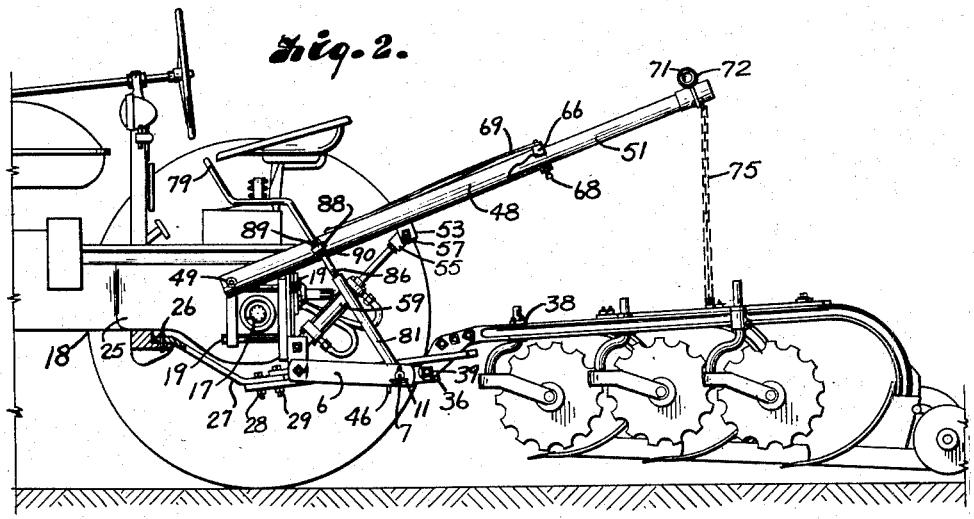
Fig. 2 is a side elevational view showing one wheel of the tractor removed.
Figure 3:
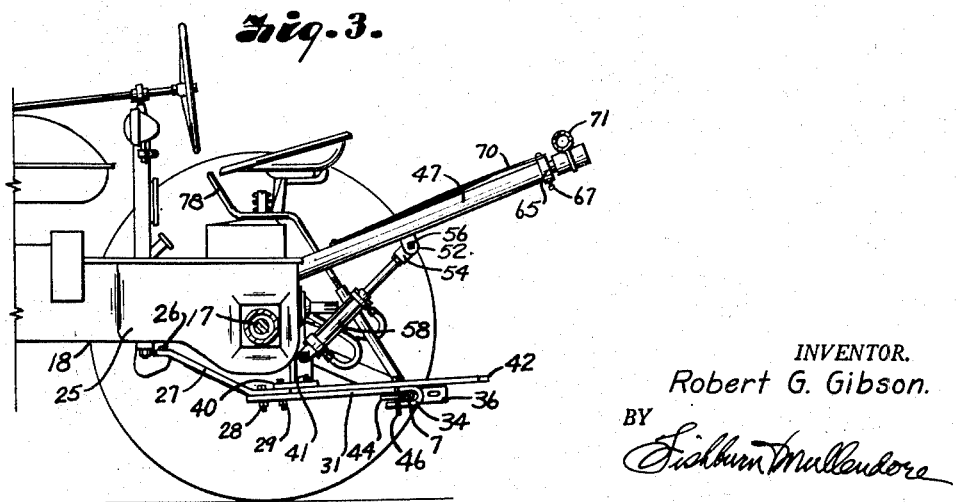
Fig. 3 is a cross sectional view particularly illustrating the connection of the hitch to the cross bar of the frame of the device.

Telescoping booms 47 and 48 are provided having one end pivotally attached to the axle housing of the tractor by bolts 49 and slightly forward of the standards 3 and 4 as best illustrated in Fig. 2. The booms 47 and 48 are here shown in tubular form and have telescoping ends 50 and 51, although other forms may be used such as angle iron or the like. The booms 47 and 48 have depending ears 52 and 53 to which are attached the ends 54 and 55, by bolts or the like 56 and 57 of hydraulic cylinders 58 and 59 Figs. 3 and 4 having their ends 60 and 61 pivotally mounted to the angle portions 13 of the standards 3 and 4 by bolts or the like 62. The cylinders are of a type common to farms having tractors and modern implements and may be borrowed and replaced as desired, so that the ends 60 and 61 may be attached to ears 52 and 53 as in Fig. 1 or to standards 3 and 4 as indicated in Fig. 4 and are operated by fluid pressure from the tractor, as is the usual practice. Lines 63 and 64 lead from the tractor to the respective ends of the cylinders and flow of fluid to and from the cylinders is regulated by the usual mechanism such as a lever (not shown) by the operator from the seat of the tractor to raise and lower the booms as desired.

Collars 65 and 66 are provided on the outer ends of the booms 47 and 48 and the telescoping ends 50 and 51 are held in place in the booms by set screws or the like 67 and 68. Brace members 69 and 70 are provided across the top of the beams to lend rigidity thereto as best illustrated in Fig. 5.

A cross arm 71 is rigidly secured to the outer ends of the telescoping portions 50 and 51 of the booms and provided with a plurality of collars 72, having depending lugs 73 provided with eyes 74 for engagement of chains or the like 75 having hooks 76 for engagement with the implement 38 as best illustrated in Fig. 2 when it is desired to transport the implement from place to place.

The draw bar carriage 2 is adjustable for depth of the implement drawn thereby by screw cranks 78 and 79 and comprising tubular members 80 and 81 having plates 82 and 83 secured at their lower ends and provided with openings for pivotal engagement with the ends of the rod 7 inside of the side arms 5 and 6. The other end of the tubular members 80 and 81 are threaded as indicated at 85 (Fig. 4) adapted to receive the threaded shanks 86 of the crank arms. Extending outwardly from the outer sides of the booms 47 and 48 are bearings 87 and 88 on each side of which are threaded nuts 89 and 90 to pivotally secure cranks 78 and 79 in bearings 87 and 88. The crank arms also secure the carriage 2 to the booms 47 and 48 so they may be moved together as a unit.

In operation of a device constructed and assembled as described and attached to the tractor as shown, the implement 38 may be attached to the ears 36 and 37 of the triangular-shaped hitch by means of the pins 39 and by reason of the swinging draw bar 26 it will provide a floating hitch so that the attaching end of the plow may move laterally to the left on the rod 7. This is particularly advantageous when turning corners with the implement attached to the tractor.

If it is desired to have a stationary hitch, the implement may be attached to the extension bar 42 and the bar adjusted laterally on the plate 44 by the pin 46 engaging in the openings 45 of said plate. The swinging draw bar 26 will apply down draft to the center of the tractor and the hitch is adjustable for depth of the implement by means of the screw cranks 78 and 79 operable from the seat of the tractor. The carriage 2 may also be adjusted by raising and lowering the same by means of the hydraulic cylinders 58 and 59 by regulation of the fluid pressure from the tractor to the cylinders to extend the pistons and at the same time raising the booms 47 and 48 by reason of the attachment of the screw cranks 78 and 79 when they are in stationary position thereby regulating the height of the hitch for the implement drawn thereby. This mechanism is particularly adapted for increasing or decreasing the draft of the plow or other instrument while the tractor is in motion through operation of the hydraulic lift control.

The telescoping booms are adjustable lengthwise by loosening the set screws 67 and 68 extending through the collar 65 and 66 on the ends of the booms, and the chains 75 may be fastened to the implement and then through operation of the hydraulic cylinders the implement may be raised from the ground for transporting as best illustrated in Fig. 2.

When the implement is attached to the triangularly-shaped member of the hitch, its line of draft may vary laterally, but when the implement is attached to the extension bar and the pin 46 is in place there will be no lateral movement of the implement with respect to the hitch. The hitch is also flexible vertically from the tractor to permit a constant line of draft rather than a sucking in and out of the ground with the raising and lowering of the front end of the tractor due to uneven terrain.

What I claim and desire to secure by Letters Patent is:

1. A device of the character described comprising a carriage, means for pivotally attaching the carriage to a tractor or the like, said carriage including side arms each having one end pivotally attached to said attaching means and a cross arm attached to the other ends of said arms, a draft bar swingingly attached to said tractor, a triangularly-shaped member secured to the free end of the draft bar, means on said triangularly-shaped member in slidable engagement with the cross arm of said carriage, means on said triangularly-shaped member for attaching an implement to said member, spaced telescoping booms each having one end pivotally attached to said tractor, ears depending from said booms about midway of their length, hydraulic means having one end pivotally secured to said carriage attaching means and the other end attached to the ears on said booms, and adjustable means connecting said booms to said carriage.

2. A device for elevating and transporting an implement attached to the hitch of a tractor or the like, comprising, spaced standards rigidly secured to the axle housing of said tractor, a carriage pivotally attached to said standards, spaced booms having one end pivotally attached to said axle housing of said tractor, means on the outer ends of said booms for attachment to said implement for suspending said implement therefrom, hydraulic means having one end pivotally connected to said standards below the attached ends of said booms and the other end attached to said booms, adjustable means connecting said carriage with said booms for regulating the height of said carriage and fluid supply means connected to said tractor and to said hydraulic means for raising said implement for transporting the same behind the tractor.

3. A device for elevating and transporting an implement attached to the hitch of a tractor or the like, comprising, spaced standards rigidly secured to the axle housing of said tractor, a carriage pivotally secured to said standards, spaced booms each having one end pivotally attached to the axle housing of said tractor, telescoping extensions on said booms, means for holding said extensions in adjusted position with respect to said booms, a cross arm on the outer ends of said extensions, means on said cross arm engageable with said implement for suspending the implement therefrom, hydraulic means having one end pivotally connected to said standards below the attached ends of said booms and the other end to said booms, adjustable means connecting said carriage with said booms, and fluid supply means connected to said tractor and to said hydraulic means for raising said implement for transporting the same behind the tractor.

4. A device of the character described comprising, spaced standards attached to a rear axle housing of a tractor or the like, a carriage including side arms each having one end pivotally secured to said standards and a cross arm connecting the outer ends of the side arms, a draft bar swingingly attached to said tractor, an arm having one end secured to said draft bar and its other end extending beyond the cross arm for attaching an implement to said tractor, means on said cross arm and said arm for securing said arm in adjusted position laterally of said cross arm, spaced booms, each having one end pivotally mounted on said axle housing and the other end extending rearwardly of the tractor, hydraulic extensible members, each having one end pivotally connected to said standards and the other end of said members being pivotally connected to said booms in spaced relation to the pivotal mounting of said booms, extensible means having connection with said booms and said carriage, and fluid supply means connected to said tractor and to said hydraulic extensible members for raising and lowering said booms.

5. A device of the character described comprising, spaced standards attached to the axle housing of a tractor or the like, a carriage including side arms each having one end pivotally attached to said standards and a cross arm attached to the other ends of said arms, a draft bar swingingly attached to said tractor, a triangularly-shaped member secured to the free end of the draft bar, means on said triangularly-shaped member in slidable engagement with the cross arm of said carriage, means on said triangularly-shaped member for attaching an implement to said member, spaced telescoping booms each having one end pivotally attached to the axle housing of said tractor, hydraulic cylinders having one end pivotally secured to said standards, piston in said cylinders, rods connected to said pistons, the free ends of said rods being pivotally attached to said booms, a cross bar connecting the outer ends of the telescoping booms, collars on said last named cross bar, chains secured to said collars for attachment to said implement, and fluid supply means connected to said tractor and to said cylinders for raising and lowering said booms to elevate said implement for transporting the same.

6. A device of the character described comprising standards attached to the axle housing of a tractor or the like, a carriage including side arms each having one end pivotally attached to said standards and a cross arm attached to the other ends of said arms, a draft bar swingingly attached to said tractor, an arm having one end secured to said draft bar and its other end extending beyond the cross arm for attaching an implement thereto, means on said cross arm and said arm for securing said arm in adjusted rigid position laterally of said cross arm, spaced telescoping booms each having one end pivotally attached to said axle housing and the other end extending rearwardly of the tractor, ears secured to and depending from said booms rearwardly of the pivot point of said booms, hydraulic extensible members, each having one end pivotally secured to said standards and the other end being pivotally attached to the ears of said booms, crank screw means connecting said booms to said carriage, means on the outer end of said telescoping booms for attachment to said implement, for suspending the implement therefrom, and fluid supply means connected to said tractor and to said hydraulic means for raising and lowering said booms and elevating said implement above ground and transporting the same.

References Cited in the file of this patent

UNITED STATES PATENTS

| | | |
|---|---|---|
| 1,243,019 | Waterman | Oct. 16, 1917 |
| 2,306,744 | Morkoski | Dec. 29, 1942 |
| 2,601,640 | Simmons | June 24, 1952 |
| 2,656,776 | Cox et al. | Oct. 27, 1953 |

FOREIGN PATENTS

| | | |
|---|---|---|
| 283,328 | Switzerland | Oct. 1, 1952 |